(12) United States Patent
Sharma et al.

(10) Patent No.: US 8,712,873 B2
(45) Date of Patent: Apr. 29, 2014

(54) SYSTEM FOR AND METHOD OF REMOTELY AUDITING INVENTORIED ASSETS

(75) Inventors: Satya Prakash Sharma, East Setauket, NY (US); Robert James Hart, Frisco, TX (US)

(73) Assignee: Zortag, Inc., Great Neck, NY (US)

( * ) Notice: Subject to any disclaimer, the term of this patent is extended or adjusted under 35 U.S.C. 154(b) by 0 days.

(21) Appl. No.: 13/550,854

(22) Filed: Jul. 17, 2012

(65) Prior Publication Data

US 2014/0025542 A1  Jan. 23, 2014

(51) Int. Cl.
*G06Q 10/00* (2012.01)

(52) U.S. Cl.
USPC ........... 705/28; 340/5.6; 340/5.92; 340/568.1

(58) Field of Classification Search
None
See application file for complete search history.

(56) References Cited

U.S. PATENT DOCUMENTS

| | | | |
|---|---|---|---|
| 8,400,494 B2 * | 3/2013 | Zalevsky et al. | 348/46 |
| 2007/0194882 A1 * | 8/2007 | Yokota et al. | 340/5.61 |
| 2007/0239569 A1 * | 10/2007 | Lucas et al. | 705/28 |
| 2009/0063307 A1 * | 3/2009 | Groenovelt et al. | 705/28 |

* cited by examiner

*Primary Examiner* — Luna Champagne
(74) *Attorney, Agent, or Firm* — Kirschstein, et al.

(57) ABSTRACT

A system and method for remotely auditing inventoried assets, particularly those financed by asset-based inventory lending, by capturing unique, non-clonable, auditing information with an interrogation device at an inventory location to indicate whether each asset is present or absent at the inventory location, and by sending inventory information about such assets based on the captured auditing information to an auditor.

14 Claims, 9 Drawing Sheets

SYSTEM FOR AND METHOD OF REMOTELY AUDITING INVENTORIED ASSETS

FIELD OF THE DISCLOSURE

The present disclosure relates generally to remotely auditing inventoried assets, particularly those financed by asset-based inventory lending, by capturing unique auditing information with an interrogation device at an inventory location to indicate whether each asset is present or absent at the inventory location, and by sending inventory information about such assets based on the captured auditing information to an auditor.

BACKGROUND

Asset-based inventory lending is a common form of financing of assets and accounts for about one-third of all U.S. commercial and industrial loans. Typically, importers/distributors/dealers/retailers need to maintain a complete stock of assets or merchandise to meet customer expectations. However, large stock levels of merchandise tie up significant amounts of working capital. Hence, a financial institution or lender provides a loan to such companies. Such loan is to be repaid as soon as the merchandise is consumed or disposed. This is different than the traditional bank line of credit that takes the merchandise as backup collateral. An asset-based inventory lender considers the merchandise to be the primary source of repayment. Asset-based inventory lending is well suited to highly leveraged importers/distributors/dealers/retailers active in industries in which the merchandise moves rapidly, as opposed to more slowly-transacted assets such as real estate.

In one form of asset-based inventory lending commonly known as "floor planning", the lender provides a revolving line of credit that allows a borrower to obtain financing for retail assets. The line of credit is made against the specific assets. As each asset is sold, the loan advance against that asset is repaid. Thus, floor plan financing allows businesses to borrow against retail inventory. The borrower then repays that loan as their inventory is sold and borrows against the line of credit to add new inventory. The lender sends the proceeds of the loan directly to the asset manufacturer and takes a purchase money security interest in the inventoried assets.

Floor planning is quite common in the automobile industry. New and used automobile dealers have hundreds of automobiles on their lots. Few dealers own the automobiles on their lots. Most automobiles are floor-planned by a bank or other financial institution, which may also provide loans to buyers when the automobiles are purchased. Floor-planning costs can run into hundreds of thousands of dollars a month for a big multi-location dealer with large automobile inventories. The dealer uses a lender's funds to gain possession of the automobiles and, until each automobile is sold, the lender holds title to the automobiles. When the dealer receives payment from the buyer, the dealer remits the loan to the lender who then releases the title to the automobile to the buyer. With a floor-planning arrangement, a used automobile dealer may go to auctions (or take trades) and have their inventory without paying for it right up front. This is extremely helpful for small dealerships that do not have the money to pay for the automobiles in advance.

Floor planning is important because it is far easier to sell merchandise in stock, i.e., "on the floor", as opposed to selling the merchandise from a catalog, or from an advertisement placed by the manufacturer. Floor-planning dealers typically enjoy increased sales and profits for this reason. When a piece of merchandise from a manufacturer is received by the dealer who has a floor-planning arrangement with a lender, the lender sends the manufacturer a check for the merchandise piece. Therefore, the manufacturer does not have to worry about when the merchandise piece is sold to the end buyer, thereby reducing costs. Examples of other merchandise commonly financed by floor planning are recreational vehicles, boats, motor homes, major appliances, manufactured homes, farm equipment, furniture, televisions, stereo equipment, computers, other high value items, and other types of merchandise usually sold under a sales finance contract.

In another variation of asset-based inventory lending, warehouse receipts financing is used by businesses that carry large inventories composed of finished goods or raw materials with a good disposal market. With warehouse receipts financing, inventories are placed in a bonded warehouse as security for loans. As a business draws inventory from the warehouse, the loan is paid back to the lender.

Asset-based inventory lending involves all the basic risks inherent in any form of financing. However, because of the lender's inability to exercise full control over the floored assets or merchandise at the borrower's site or inventory locations, the exposure to loss is generally greater than in other types of financing. It is important for the lender to review the number of merchandise units sold and the number of merchandise units in inventory at any given time at each inventory location to determine the corresponding collateral value. Unlike most collateral on loans that is mostly static, the retailer is in more control over the collateral under a floor-planning arrangement, and that makes it harder for the lender to control because the collateral will fluctuate from day-to-day. For that reason, the lender must audit or check the inventory of the borrower often to make sure that the loan remains adequately covered.

Thus, an inherent weakness in any inventory-based loan is the lender's inability to exercise full control over the collateral. Sometimes the inventory is sold, but the lender's loan is not repaid. The dealer/retailer in this case may be taking advantage of a float, i.e., using proceeds of sold inventory before remitting the payment to the lender promptly, as required by the floor-planning agreement.

In order to assure that asset-based financing is not being misused by the borrower in any manner, it is known for the lender to require reliable, timely financial and inventory reporting and weekly/daily collateral reports. The lender may also require the buyer to submit to regular inspections, audits, or appraisals by independent third parties. The lender may periodically visit the dealer on-site to count the units of merchandise in inventory and/or review sales records and other documents to ensure that the dealer is remitting payment to the lender as soon as the merchandise units are sold.

However, even assuming cooperation with the dealer/retailer/warehouse/borrower, it has proven difficult to perform such audits in an accurate, inexpensive, and timely manner. The assets may be at different geographical inventory locations. The assets can often be rapidly and hourly moved from one place to another. The assets can frequently be converted to cash and can thereupon be difficult to identify without physical inspection. The lenders and the retailers/dealers are normally at different locations and, without actual travel and on-site inspection by an auditor or trusted agent of the lender, it is simply not practical to accurately, inexpensively, and timely identify the presence or absence of any one or more assets at a dealer/retailer/warehouse/borrower site.

Locating assets in situ at a dealer/retailer/warehouse/borrower site is, therefore, of paramount importance to protect the interests of lenders. Lenders have tried various methods to assure that their loans against their collateral inventory are appropriately safeguarded. Some of these methods deploy outside auditors and surprise auditing visits. Sometimes, lenders will work only with trusted and authorized distributors/retailers. Other methods use seals, markings, or cryptographic certificates of various kinds to assure inventory integrity and security. For example, bar code symbol labels or radio frequency identification (RFID) tags have been used to track assets. A label/tag is affixed to an asset and is read by machine-readable readers or scanners at designated locations. For example, labeled/tagged assets at an automobile dealer or at a distribution center can be read and identified by a scanner, and this information is stored in a database.

However, unscrupulous dealers/retailers have become quite sophisticated in thwarting these methods. RFID tags can be easily compromised, and bar code symbols can be easily copied. A dishonest dealer/borrower can copy a bar code symbol on a label and/or tamper with an RFID tag, sell the labeled/tagged asset, and continue to scan the copied bar code symbols and compromised RFID tag, and send the copied information to the lender as fake proof that the dealer/borrower still has the asset. Lenders have tried to modify and combine bar code symbols, RFID encryption, decryption, and other and similar approaches to further strengthen the audit. However, none of these approaches have proven to be effective in preventing fraud. As a result, serious problems continue to plague the security and integrity of such inventory audits Accordingly, it is desirable to make available to lenders an easy, fast and foolproof system to remotely audit their inventoried assets at any inventory location in an accurate, inexpensive, and timely manner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. Some of the elements may be combined into smaller subsets or further broken down during implementation.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this invention is directed to a method of, and a system for, remotely auditing inventoried assets. The method is performed by configuring auditing information for each asset as a random distribution of a multitude of non-clonable elements, e.g., three-dimensional, light-modifying elements, by associating the auditing information with each asset, by associating identification information with each asset, by capturing the auditing information and the identification information associated with each asset with an interrogation device at an inventory location, by identifying each asset from the captured identification information at the inventory location, by determining from the captured auditing information whether each identified asset is present or absent at the inventory location, and by sending to an auditor inventory information about the assets based on the captured auditing information and the captured identification information.

Before an asset can be audited, it must have an identifier or identification information of some kind. It could be a model number and/or a serial number and/or an alphanumerical code. For example, for electronic products, the model, the model code, the power source and the serial number typically identify a product. For automobiles, the vehicle identification number (VIN) uniquely identifies an automobile.

The VIN is a unique number that follows rules agreed upon by the automotive industry. The National Highway Traffic Safety Administration of the United States standardized in 1981 that all vehicles sold must contain 17 alphanumeric characters (excluding letters I, O and Q). The first three characters uniquely identify the manufacturer of the vehicle using the World Manufacturer Identifier (WMI) code. The first character of the WMI code is the region in which the manufacturer is located. In practice, each is assigned to a country of manufacture. Some manufacturers use the third character as a code for a vehicle category (e.g., a bus or truck), a division within a manufacturer, or both. For example, within 1G (assigned to General Motors in the USA), 1G1 represents Chevrolet passenger cars; 1G2 represents Pontiac passenger cars; and 1GC represents Chevrolet trucks. The 4th to 9th characters in the VIN are the vehicle descriptor section (VDS), which is used, according to local regulations, to identify the vehicle type, and may include information on the automobile platform, the model, and the body type. The 9th character is used as a check digit that is compulsory for vehicles in North America. The 10th to 17th characters are used as the vehicle identifier section (VIS), which is used by the manufacturer to identify the individual vehicle, and may include information on options installed, or engine and transmission choices, but often is a simple sequential number. The VIN is generally provided on a label or tag, which is affixed to each vehicle at one or more locations thereon.

Figure 1A:
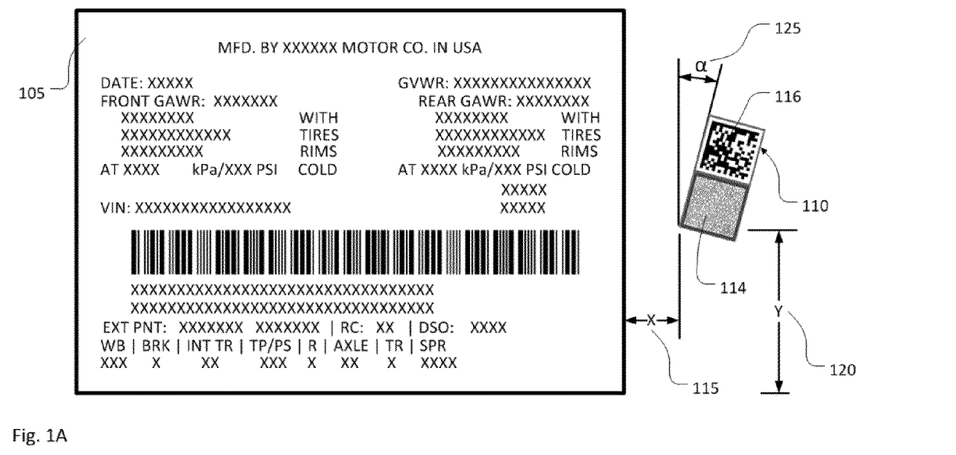
FIG. 1A is a view of an auditing label spaced apart from an identification label that together bear auditing information and identification information for use in remotely auditing inventoried assets in accordance with this invention.

Reference numeral 100 in FIG. 1A generally identifies an exemplary identification label 105 and an auditing label 110 (shown in isolation in FIG. 9) affixed on an asset 112 (see FIG. 9) in a spaced-apart relationship. Identification label 105 includes the VIN in human-readable form, as well as in machine-readable form, e.g., as a bar code symbol that can be electro-optically read by a bar code reader or scanner. Identification label 105 is placed, etched, or engraved, at a suitable location on the asset. The identification label 105 is typically affixed by the manufacturer. The auditing label 110 could be affixed by the manufacturer, or by any other party. In an automobile, the identification label 105 is typically placed by the manufacturer in the door frame, and/or inside the hood, and/or under the windshield in the left-hand corner of the dashboard, or in any other place; and the auditing label 110 could be affixed by the manufacturer, or a distributor, or a dealer, or by any other party requested by a lender. In an electronic product, the identification label 105 is typically placed on its bottom surface.

As discussed above, the identification information, e.g., the VIN or the serial number, is used by lenders to track asset inventory. However, as also discussed above, a dishonest dealer can copy the VIN, the product serial number, the bar code symbol, or the RFID tag, etc., and sell the asset, and continue to scan and send the copied identification information to the lender as fake proof that the dealer still has the asset. One aspect of this invention seeks to prevent this by employing the auditing label 110 that is virtually impossible to clone.

Figure 9:
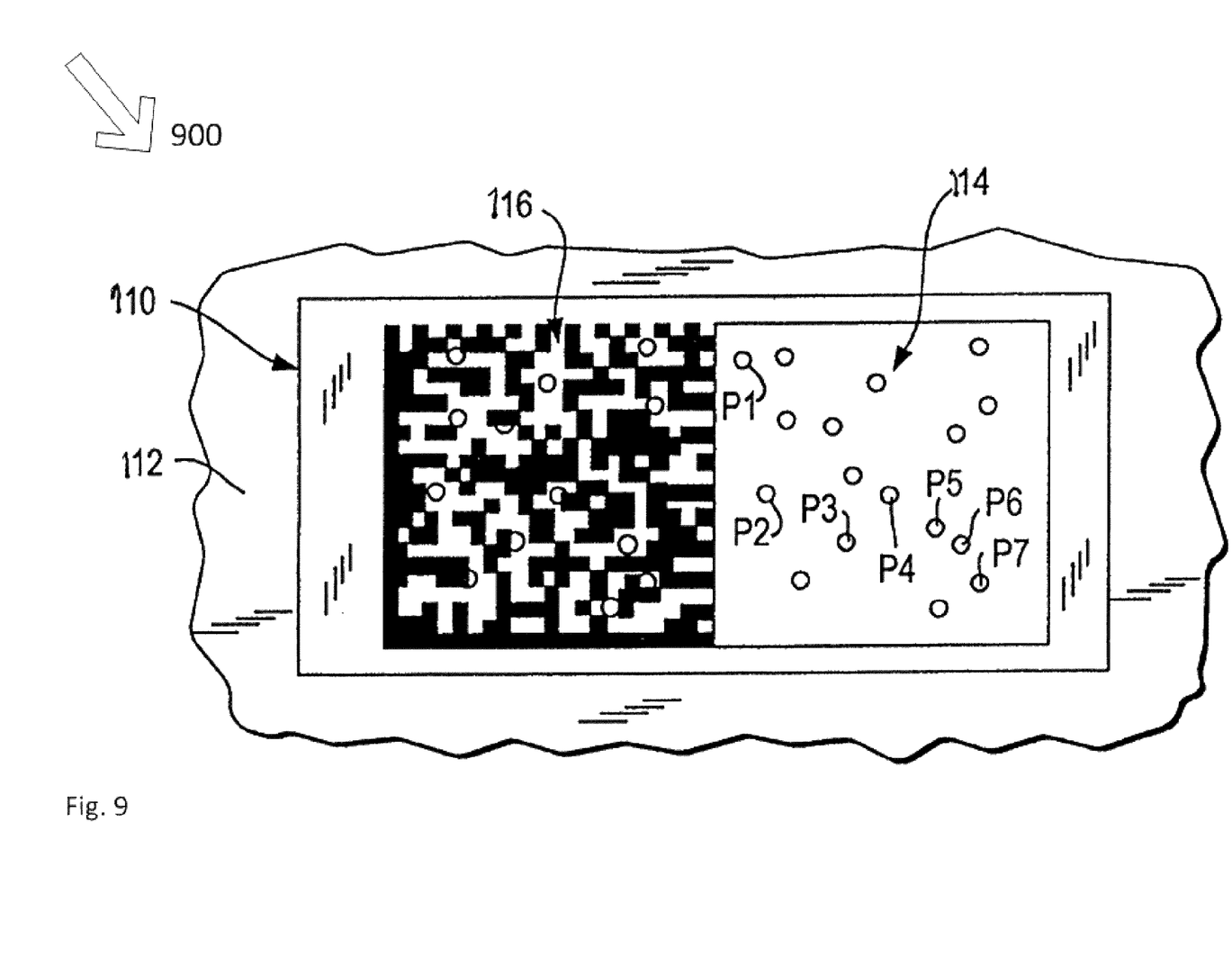
FIG. 9 is an enlarged view depicting the auditing label of FIG. 1A in accordance with this invention.

As described in detail in an earlier U.S. patent application Ser. No. 13/269,726, filed on Oct. 10, 2011, whose entire disclosure is hereby incorporated herein by reference thereto, the auditing label 110, as best seen in FIG. 9, includes a first dataset 114 configured as a random distribution of a multitude of three-dimensional elements, e.g., at least three, and preferably more, representative elements P1-P7, the elements P1-P7 preferably being light-modifying particles and/or bubbles and/or depressions and/or like structures and/or combinations thereof that are each sized between 25 microns and 5 millimeters, and preferably between 50 microns and 3 millimeters, and that can have any shape, color, material, interior structure (hollow or solid), or size. The light-modifying particles are either optically reflective or retro-reflective, or scattering, or absorptive, or fluorescent, over one or more different wavelengths to exhibit different colors. Such three-dimensional elements P1-P7 are sufficiently large enough to cast shadows and/or have characteristic colors, for subsequent image capture by an image capture device or interrogation device, as described below. The three-dimensional elements P1-P7 are unique for each asset and are physically unclonable, e.g., they cannot be duplicated by copying or by being photographed and, as a result, represent a powerful tool to prevent audit fraud. The three-dimensional elements P1-P7 are advantageously incorporated into the auditing label 110 by inkjet printing, or by being applied in a curable medium on the label, or by being adhered to the label. The three-dimensional elements P1-P7 can also be applied or adhered directly to the asset 112.

As also best seen in FIG. 9, the auditing label 110 includes a second dataset 116 configured as a plurality of data elements. The data elements are machine-readable, for example, they can be light-modifying, as described above. When the data elements reflect and absorb light, the same image capture or interrogation device that captured return light from the first dataset 114 can be used to capture light from the second dataset 116. The return light from the datasets 114, 116 can be captured simultaneously or consecutively. Advantageously, the second dataset 116 is a bar code symbol printed on the auditing label 110, but could also be a serial number of alphanumeric characters, or an RFID tag. The second dataset 116 could be a two-dimensional bar code symbol as illustrated, but could be a one-dimensional symbol, a truncated symbol, a stacked symbol, or could be a serial number composed of alphanumeric characters, or an RFID tag, or the VIN, or the product serial number.

The information in the first data set 114 is used as an auditing pattern signature and is remotely stored in an addressable database. The authenticity of the auditing label 110 is checked by capturing the image of the auditing pattern signature of the first dataset 114, first confirming that the auditing pattern signature is indeed three-dimensional, and then checking the relative unique positions of the three-dimensional elements P1-P7. The database stores a multitude of other auditing pattern signatures for other assets. The second dataset 116 serves as an address identifier that identifies an address for the auditing pattern signature in the remote database, thereby enabling the database to be interrogated only at that address, rather than having to interrogate every auditing pattern signature in the database. This greatly accelerates the inventory auditing process and improves field auditing performance.

Advantageously, the image capture device is a mobile electronic device having a solid-state imaging module of the type conventionally found in consumer electronic digital cameras. The mobile electronic device is typically a cellular telephone or smartphone that has a built-in imaging module, but can also be a personal digital assistant (PDA), a tablet, a computer, an e-reader, a media player, or like electronic device having a built-in imaging module, especially one that is normally readily at hand, or the image capture device can be a standalone device. It could also be a standard bar code symbol reader or an RFID reader having an imager to capture the image of the auditing label 110. No special skill set is required for a user to capture the return light from the auditing label 110, other than simply taking a picture of the first and second datasets.

Returning to FIG. 1A, the auditing label 110 can be affixed near or adjacent to the identification label 105. As an exemplary illustration, in FIG. 1A, the auditing label 110 is shown near the VIN identification label 105 of an automobile. The auditing label 110 can be parallel to the VIN identification label 105, or oriented at an angle ($\alpha$) 125, as illustrated. One corner of the auditing label 110 can be measured from the location of the VIN identification label 105 as shown by horizontal dimension (X) 115 and by vertical dimension (Y) 120. The dimensions X, Y and angle a describe the relative position of the auditing label 110 with respect to the VIN identification label 105. It will be understood that other coordinate systems may be used to capture the relative position of the auditing label 110 with respect to the VIN identification label 105.

Knowing the relative position of the auditing label 110 with respect to the VIN identification label 105 when the auditing label 110 is first installed in the field by an unskilled person, or by a trusted or non-trusted entity, is another important tool to prevent audit fraud, because this positional information can also advantageously be captured by the image capture device and stored in the remote database, and can be used to verify the integrity of the audit. If a non-trusted, unscrupulous entity tries to remove the auditing label 110 and uses a copy of the VIN identification label 105, and then tries to affix the auditing label 110 back to its original position, it will be very difficult for the non-trusted entity to position the auditing label 110 at the exact coordinates originally stored in the database. In addition, an adhesive at the back of the auditing label 110 may be made very aggressive such that the auditing label 110 will self-destruct before complete removal. The auditing label 110 may also have a void feature that will show a void on the auditing label 110 if someone tried to remove the auditing label 110 from the asset where it was originally affixed.

To further assure that an authorized auditing label 110 is indeed on the asset, and not on a copied image or photograph of the auditing label, the three-dimensional geometric nature of an asset surface on which the auditing label 110 has been mounted can be reconstructed, or estimated, from two-dimensional images. One method is based on stereo-vision, such as human vision system. Thus, when two photographs of the asset surface are taken, then intrinsic parameters of the photographs, such as the focal length, and extrinsic parameters of the dual cameras taking the photographs, such as the relative translation and rotation between the cameras, can be obtained. Then, the two photographs can be registered by using feature extraction, and optimized with epipolar constraints, thereby enabling the three-dimensional geometric nature of the asset surface to be reconstructed.

The three-dimensional geometric nature of the asset surface can also be estimated from a motion video. Points on each video frame can be tracked using an optical flow method, after which the motion information and the geometry of the surface can be estimated reliably using parallax information. The three-dimensional geometric nature of the asset surface can also be estimated from a single photograph under certain circumstances. For surfaces with global symmetry, such as a car body, its three-dimensional geometry can be recovered from a single image.

Auditing can be performed using real time interaction. If a server authorized by the lender/auditor asks the dealer to shoot the motion video of the auditing label 110 on the asset through a mobile image capture device, such as cell phone, the video shot by the dealer is transmitted to the server in real time. The server can send random requests to the dealer, such as how to change the position/orientation/motion of the device. Then, based on the response time, the server can verify if the dealer is shooting the video on a real asset or not.

Figure 1B:
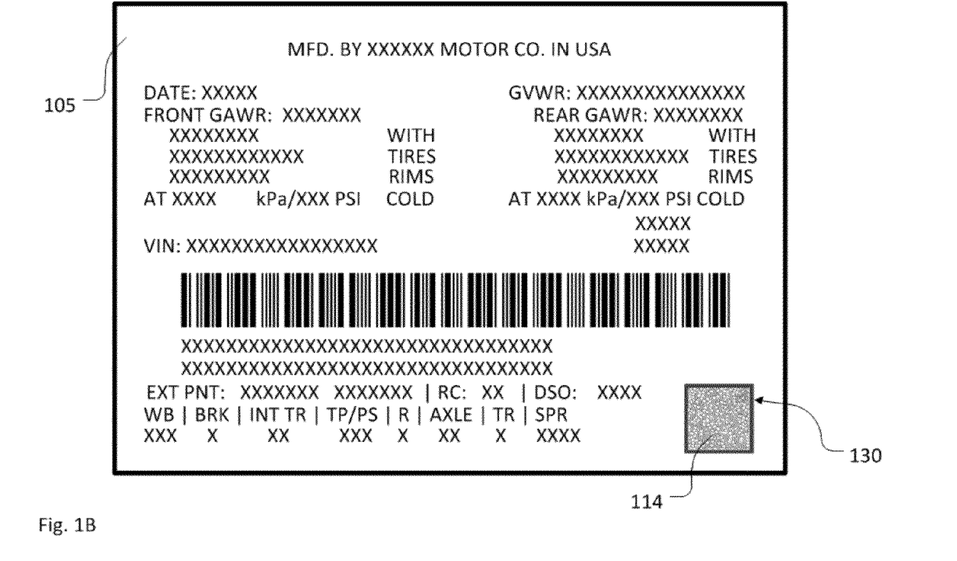
FIG. 1B is a view of an auditing label superimposed on an identification label that together bear auditing information and identification information for use in remotely auditing inventoried assets in accordance with this invention.

Rather than configuring the auditing label 110 with two datasets 114, 116, FIG. 1B depicts another auditing label 130 composed of only the first dataset 114, again configured as a random distribution of a multitude of three-dimensional elements P1-P7. Rather than attaching the auditing label 110 away from the identification label 105, FIG. 1B depicts that the auditing label 130 is superimposed on the VIN identification label 105. The VIN or the product serial number then advantageously serves as the address identifier previously provided by the second dataset 116 of the auditing label 110. Again, the identification label 105 is typically affixed by the manufacturer, and, in the embodiment of FIG. 1B, the manufacturer or any other party also advantageously affixes the auditing label 130. If the auditing label 130 is directly incorporated into the identification label 105 in a unitary construction, then the manufacturer simultaneously affixes both labels. Of course, a distributor, or a dealer, or any other party assigned by a lender, could also affix the auditing label 130 in a separate operation.

In another embodiment, the auditing label 110 can be affixed on an exterior surface of an automobile windshield, and a background label can be put on a interior surface of the windshield. The background label could be a hologram or a Moire label. The background label could be affixed near the VIN identification label 105.

Figure 2:
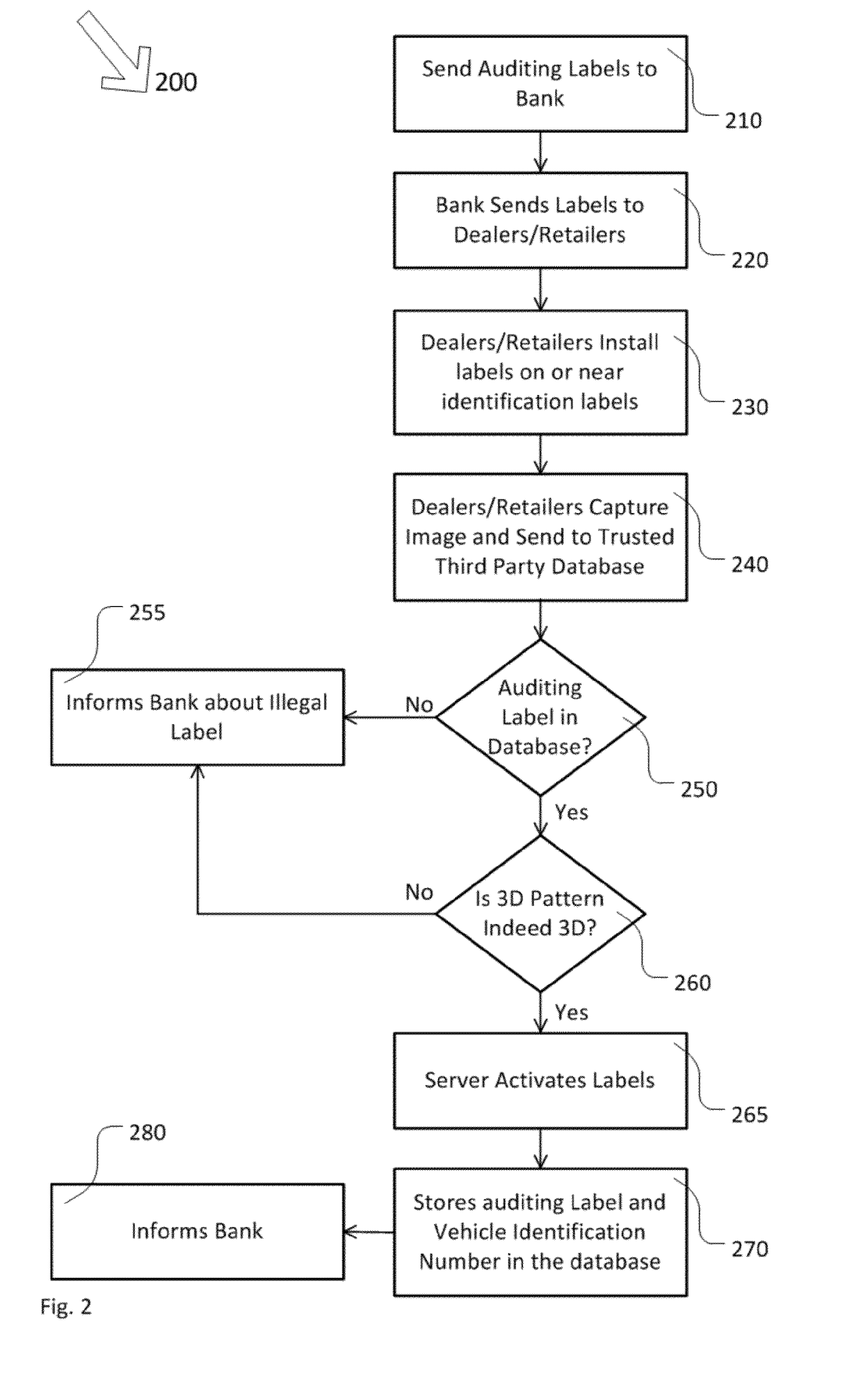
FIG. 2 is a flow chart depicting how the labels of FIGS. 1A, 1B are initially processed in accordance with the method of this invention.

FIG. 2 is a flow chart 200 depicting how each auditing label 110, 130 is applied on an asset, e.g., an automobile, either adjacent to, or superimposed on, the identification label 105, and thereupon, activated and stored in a database. At step 210, banks/lenders/financing institutions get the auditing labels from a label manufacturer of a trusted third party. The bank then sends these auditing labels to the businesses where the assets are located in step 220. Alternatively, the bank may instruct the trusted third party to send the auditing labels directly to these businesses. The businesses install these auditing labels in step 230 on or near the VIN identification label 105. At step 240, the businesses capture the images of the VIN identification label 105 and the auditing label with an image capture or interrogation device, and sends the captured information to a remote database of a trusted third party, and advantageously simultaneously informs the bank that the auditing labels have been installed on the assets being financed. The image capture device advantageously has a global positioning satellite (GPS) module built into the device for location tracking, and this location information may also be sent to the database. Alternatively, the location information can be entered manually.

In step 250, a check is made to see if the auditing label already exists in the database. If the auditing label is not in the database, then this breach is communicated to the bank in step 255. If the auditing label does exist in the database, then a check is made to confirm that the three-dimensional pattern of the dataset 114 is indeed three-dimensional in step 260. If not, then the auditing label is fake, and this information is communicated to the bank. If the auditing label is found to be authentic, then a server activates or authorizes the auditing label in step 265. Unactivated auditing labels are initially provided to the bank or to the businesses prior to attachment to the asset. The auditing labels must be activated and applied to the assets for tracking the asset inventory. If the auditing labels are not activated in a reasonable time after the assets have been acquired, then this indicates a breach of trust between the lender and the borrower.

The identification information, such as the VIN, and the auditing information, such as the image of the three-dimensional auditing pattern signature from the first dataset 114, are stored in the remote database in step 270 at the address identified by the address identifier, e.g, the VIN or the second dataset 116. The server also advantageously stores any positional information 115, 120, 125 in the case of the auditing label 110. Other information about the asset may also be stored, such as repair history, warranty terms, any liens, and any other pertinent information that is of interest. After such activation and storage, the bank is informed that the asset is ready for remote auditing in step 280. All these operations are managed by computer programs stored in various servers and a remote database with little intervention by human beings, as described below.

Figure 3:
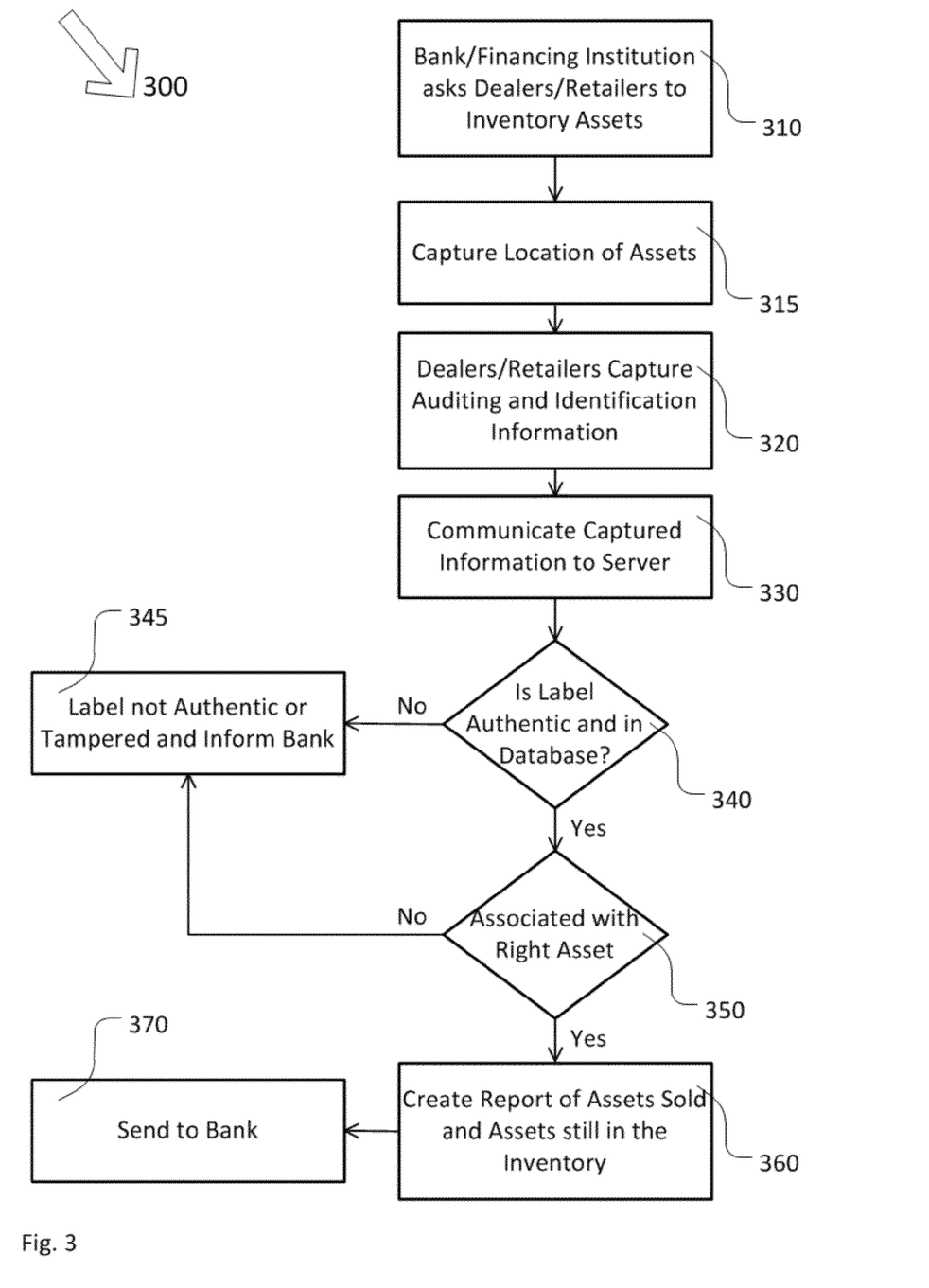
FIG. 3 is a flow chart depicting how the labels of FIGS. 1A, 1B are subsequently processed in accordance with the method of this invention.

Reference numeral 300 in FIG. 3 identifies a flow chart depicting how the assets are remotely audited whenever deemed necessary by the bank. At step 310, the bank requests the dealer/business to provide a census indicating the status (presence or absence) of the assets at each of their inventory locations. The image capture device, preferably with built-in GPS, automatically captures the location of each asset at step 315. Alternatively, the location can be entered manually at step 315. At step 320, the identification information from identification label 105, and the auditing information from the auditing label 110, 130, are captured. Positional and other information may also be captured. All this captured information is communicated to a remote server and database in step 330. If an asset has been moved from a location where it was expected to be at the dealer site, e.g., it was sold, then this information will be captured by the GPS-equipped capture device and will be communicated to the lender.

In step 340, a check is made to see if the auditing label exists in the database and is authentic/activated, e.g. whether it indeed has a three-dimensional auditing pattern. If the check fails, then this information is communicated to the bank in step 345. A failure in step 340 implies that the dealer is using a fake or copied auditing label. If the auditing label is authentic, then a check is made in step 350 to determine whether this auditing label is indeed associated with the correct asset, and also whether the positional information, if any, also matches the stored positional information. If a failure occurs at this step 350, then it implies that an attempt has been made by the dealer to circumvent the inventory auditing process requested by the bank. At step 350, it is also checked to determine if the auditing label is at the right location where it is expected to be. If any of these requirements are not met, then the integrity of the inventory auditing process cannot be confirmed. An inventory information report showing those assets that have not been found in the inventory, as well as those that have been found in the inventory, is prepared in step 360. This report is sent to the bank in step 370. All these operations are advantageously managed by computer programs stored and processed in various servers and databases with little intervention by human beings, as further described below.

Figure 4:
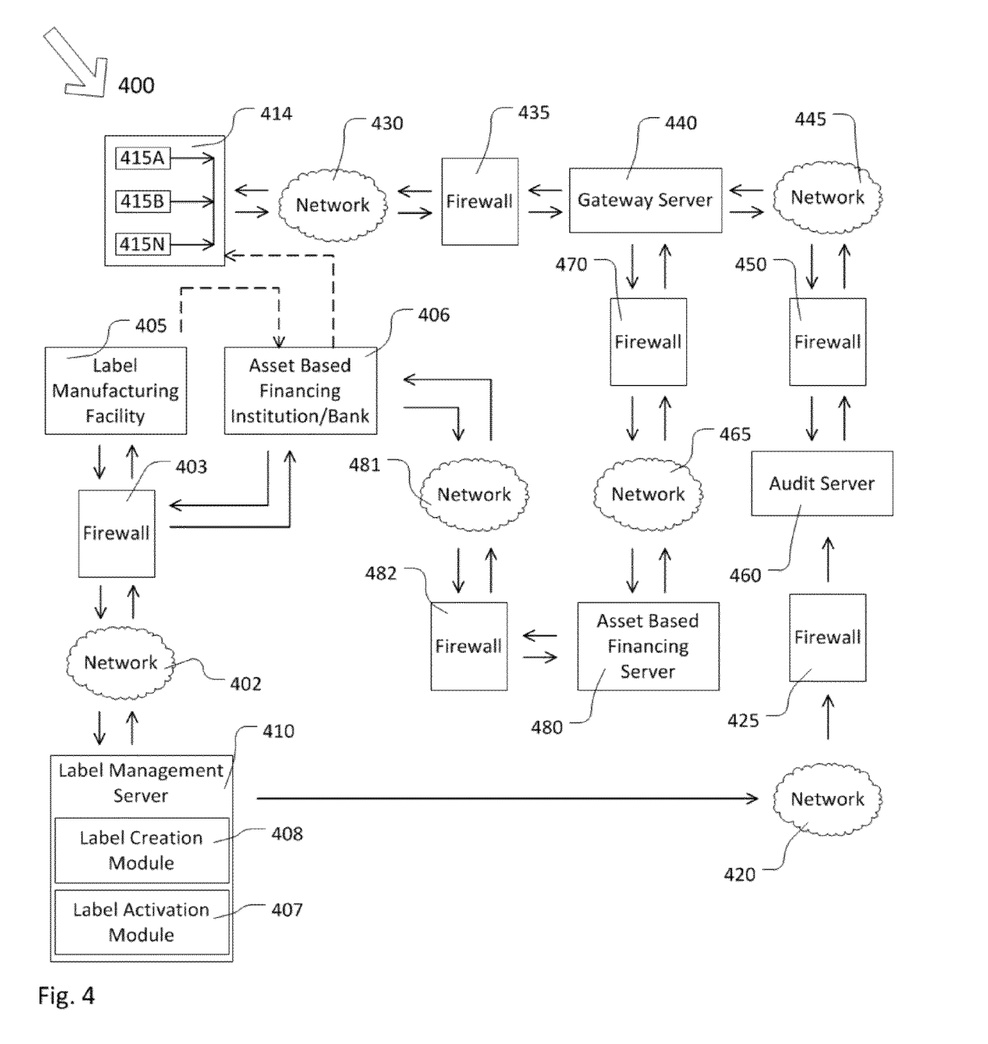
FIG. 4 is a block diagram depicting an overall system for remotely auditing inventoried assets in accordance with this invention.

Reference numeral 400 in FIG. 4 generally identifies a system for remotely auditing assets in accordance with this invention. System 400 includes a Label Management Server (LMS) 410 that is in bidirectional communication with label manufacturing facility 405 via a network 402 and a firewall 403, one or more handheld interrogation devices 415A, 415B . . . 415N at one or more inventory locations or dealer/retailer sites 414, a gateway server 440, an audit server 460 and an Asset Based Financing Server (ABFS) 480. The LMS 410 is in unidirectional communication with the audit server 460 via a network 420 and a firewall 425. Each interrogation device at a respective inventory location 414 is in bidirectional communication with the gateway server 440 via a network 430 and a firewall 435. Gateway server 440 is in bidirectional communication with the audit server 460 via a network 445 and a firewall 450. The gateway server 440 is also in bidirectional communication with the ABFS 480 via a network 465 and a firewall 470. The label manufacturing facility 405 physically ships auditing labels to an asset-based lender facility 406, who, in turn, sends the auditing labels to retailers/dealers/borrowers. Alternately, the lenders may direct that the label manufacturing facility 405 send the auditing labels directly to the dealers/retailers at each inventory location 414. The physical movement of the auditing labels is shown as dotted lines in FIG. 4. The asset-based lender facility 406 is in bidirectional communication with the LMS 410 through the network 402 and the firewall 403. The asset-based lender facility 406 is also in bidirectional communication with the ABFS 480 through a network 481 and a firewall 482. Although several servers have been illustrated in FIG. 4, this is not intended to be limiting, because this invention contemplates that a different numbers of servers could be deployed, or combined into fewer ones, or expanded into higher numbers, or could be all combined into a single system server.

The LMS 410 manages the creation and activation of auditing labels and directs the label manufacturing facility 405. After the lender decides to finance floor-planned inventoried assets, the lender directs the LMS 410 to design auditing labels that include, for example, a lender identification number, an asset type, an asset serial number, a three-dimensional auditing pattern signature, and other auditing information of interest to the lender. This design and numbering information is communicated to the label manufacturing facility 405 for production of the auditing labels. This process of label design and creation is managed by a label creation module 408 in the LMS 410. The label manufacturing facility 405 may ship these auditing labels to the lender facility 406, or to the dealers/retailers/businesses 414 that are financing the assets.

As described above, these auditing labels are affixed to the assets 112 being financed. The asset identification information, such as the VIN or serial number, and the asset auditing information, which includes the non-clonable, unique, three-dimensional image pattern, are captured by a respective interrogation device in the field at the inventory location 414. All this information, including location information and, advantageously, when the auditing label was affixed to the asset, are communicated by the dealer/retailer to the lender facility 406 which, in turn, transfers all this captured information to the LMS 410. Each auditing label is deemed to have been activated at that moment, and this activation process is managed by a label activation module 407 in the LMS 410. The label activation module 407 will send the captured information to a database 630 (see FIG. 6) of the audit server 460 for storage. The address identifier will identify the data storage location in the database 630 for storing the auditing image pattern signature.

Each interrogation device could be any device with a built-in imaging module such as a CCD module, and a transceiver capable of transmitting and receiving bidirectional data and/or video and/or text over a packet-based or non-packet-based communications network. Each interrogation device could be a handheld barcode scanner with an imager module, or an RFID reader with an imager module, or a cellular telephone, smart phone, net phone, Internet protocol phone, personal digital assistant (PDA), computer, e-reader, media player, or like electronic device with an imaging module. An exemplary image capture device is disclosed in the above-referenced and incorporated U.S. patent application. Each image capture device captures return light directly from the asset, or from a label or tag associated with, or affixed to, the asset, as an image. The image is processed to capture the identification information and the auditing information. Each image capture device communicates with the gateway server 440 in encrypted or unencrypted form, and in real or delayed time.

When the lender desires to audit the assets at the dealer/retailer site 414, the lender directs the ABFS 480 to start the process. The ABFS 480 will communicate with the gateway server 440 that, in turn, will communicate with the dealer/retailer at site 414 to capture the image of the auditing label 110 and the identification label, and send this images to the gateway server 440. The gateway server 440 will communicate with the audit server 460 to compare the captured auditing image pattern with the stored auditing pattern image signature at the corresponding address, and, when a match occurs, confirm the asset from which the image was captured. The audit server 460 will communicate with the gateway server 440 that, in turn, will communicate with the ABFS 480 and provide the result of the authenticity of the asset. The ABFS 480 will prepare an appropriate inventory report to send to the lender facility 406. Such reports can be generated at any time as requested by the financing entity, e.g., daily, every two days, twice a day, weekly, bi weekly, etc. In a variation when RFID-based interrogation devices are employed, the ABFS 480 could initially direct an interrogation device to generally determine which assets are on the floor at a particular location, and then a sampling could be ordered either on the assets that are found to be present in an initial reading session, or on the assets that were not found, but should have been found, in the inventory. If any asset is not found in the sample, then the ABFS 480 could request that each and every asset be separately audited. If nothing unexpected was found in the sample, then the ABFS 480 could skip a complete audit.

The networks 430, 445, 465, 402, 481 and 420 may include any wired, wireless, or optical network capable of transferring data and may include public switched telephone networks, local area networks, ad-hoc network mesh network, a free space optical network, an optical network, a metro area network or a wireless local area network, Wi-Fi, Bluetooth, WiMax or LTE network etc., metropolitan area networks, wide area networks, such as 2G, 3G, 4G or higher, the Internet, etc., and can use any network protocol, i.e., Internet Protocol (IP), Asynchronous Transfer Mode (ATM) or Synchronous Optical Network (SONET), etc. The networks 430, 445, 402, 465, 481 and 420 may also include network devices, such as routers, switches, firewalls, gateways, communication interfaces, input devices, output devices, and buses to interconnect such server components as processors, microprocessors, random access memories (RAMs), dynamic storage devices, read only memories (ROMs), etc. Networks 430, 445, 402, 465 and 481 may transfer data bidirectionally while network 420 will be primarily transferring data unidirectionally.

As is customary in the art, servers 440, 460, 480, and 410 also utilize firewalls 435, 450, 470, 425, and 403 and 482 to assure that the security of the servers cannot be breached and, wherever appropriate, the data is encrypted as it moves between the various servers to further secure the data transmission.

Figure 5:
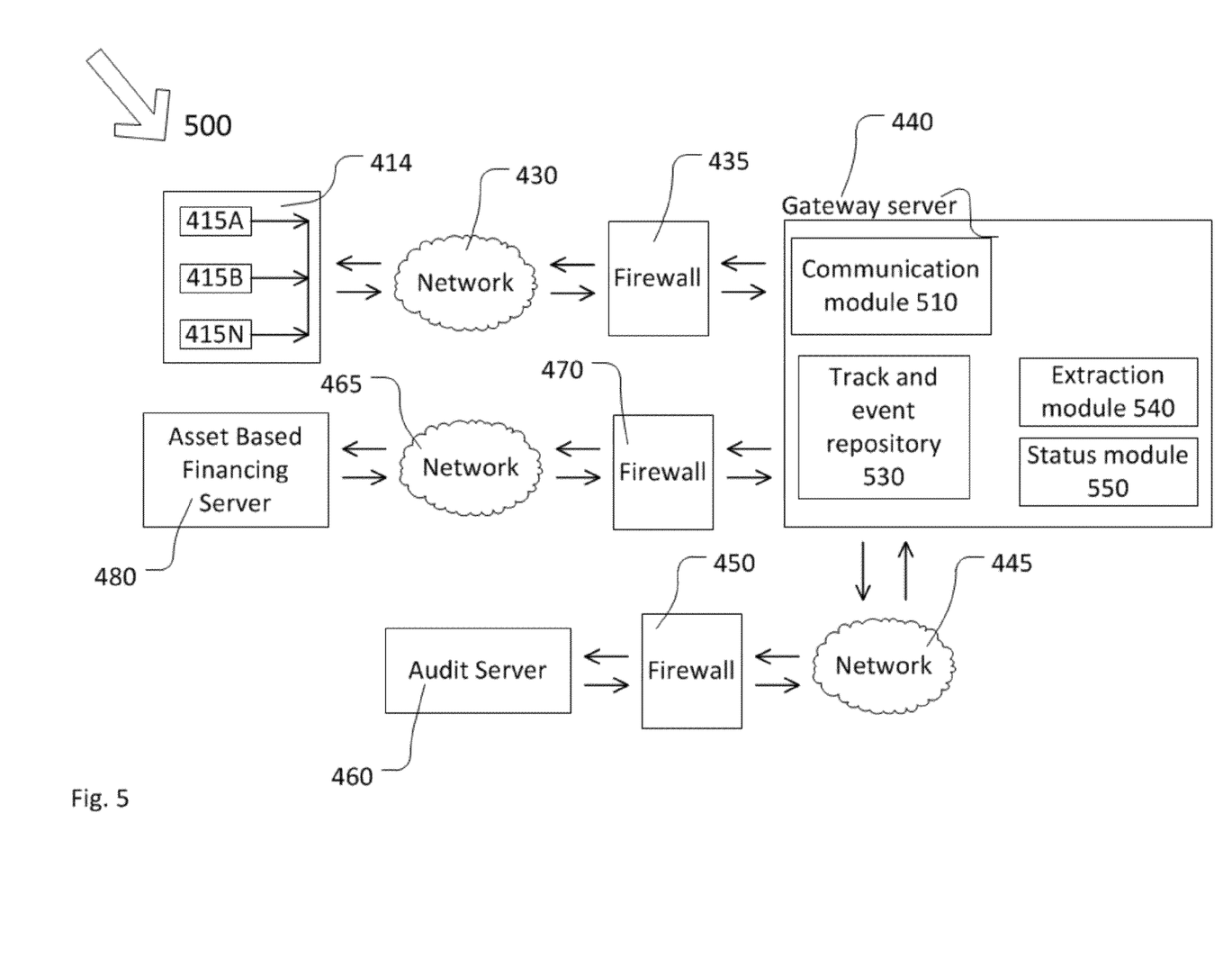
FIG. 5 is a block diagram depicting a part of the system of FIG. 4.

As best shown in the block diagram 500 of FIG. 5, the gateway server 440 includes hardware and software programmed to perform certain functions in response to software instructions contained in a computer readable medium. The gateway server 440 interacts with multiple image capture devices 415A, 415B, . . . , 415N and may run such applications as database applications, email applications, communication applications, and e-commerce applications. The gateway server 440 includes a communication module 510 for sending a request to each retailer/dealer and receiving information from the devices 415. The devices normally have an application preloaded from the gateway server 440. The fetched application resides in the devices 415 and may be launched by actuating an icon displayed on the devices or through triggers on the devices. At the same time, the communication module 510 checks if the devices 415 were previously registered in the system and, if not previously registered, the communication module 510 seeks registration information, for example, the ID or the phone number of the device, or a device ID number and user profile information, for example, the user's email address, demographics and the location, etc. This information may be useful to track the location and also the person or machine who attempted to audit the asset and the time such an attempt was made.

As noted above, the information captured by the devices 415 includes the captured auditing information and the captured identification information. An extraction module 540 in the gateway server 440 separates and distinguishes the auditing information from the identification information. When the gateway server 440 receives a request for auditing an asset and tracking from the ABFS 480, the gateway server 440 directs each device 415 at the dealer/retailer site 414 to capture and send the captured information needed to audit the asset and, after receiving that information, the gateway server 440 transmits that information to the audit server 460. Typically, the auditing information to be sent to the audit server has two parts. One is an address identifier, e.g., a number encoded in the bar code or radio frequency identification (RFID) or other addressing means, and the other is an auditing pattern image. The audit server 460 has a database (see FIG. 6) that has a pre-stored reference auditing information or signature that was affixed to each asset or was embedded into the asset and includes both an address and an associated reference image or signature. In addition, each device 415 also captures the asset identification number, such as the VIN. The VIN was also previously stored in the database 630 and used for comparing the captured information with the pre-stored information.

A status module 550 in the gateway server 440 sends the inventory results and status of the audit to the ABFS 480 through the communication module 510. Also included in the gateway server is track and event repository module 530, which tracks and keeps the status of the assets that were inventoried. The number of times a given asset was audited, and the locations and times where and when the asset was requested to be audited, can be tracked, and all these events can be kept in the repository module 530.

Figure 6:
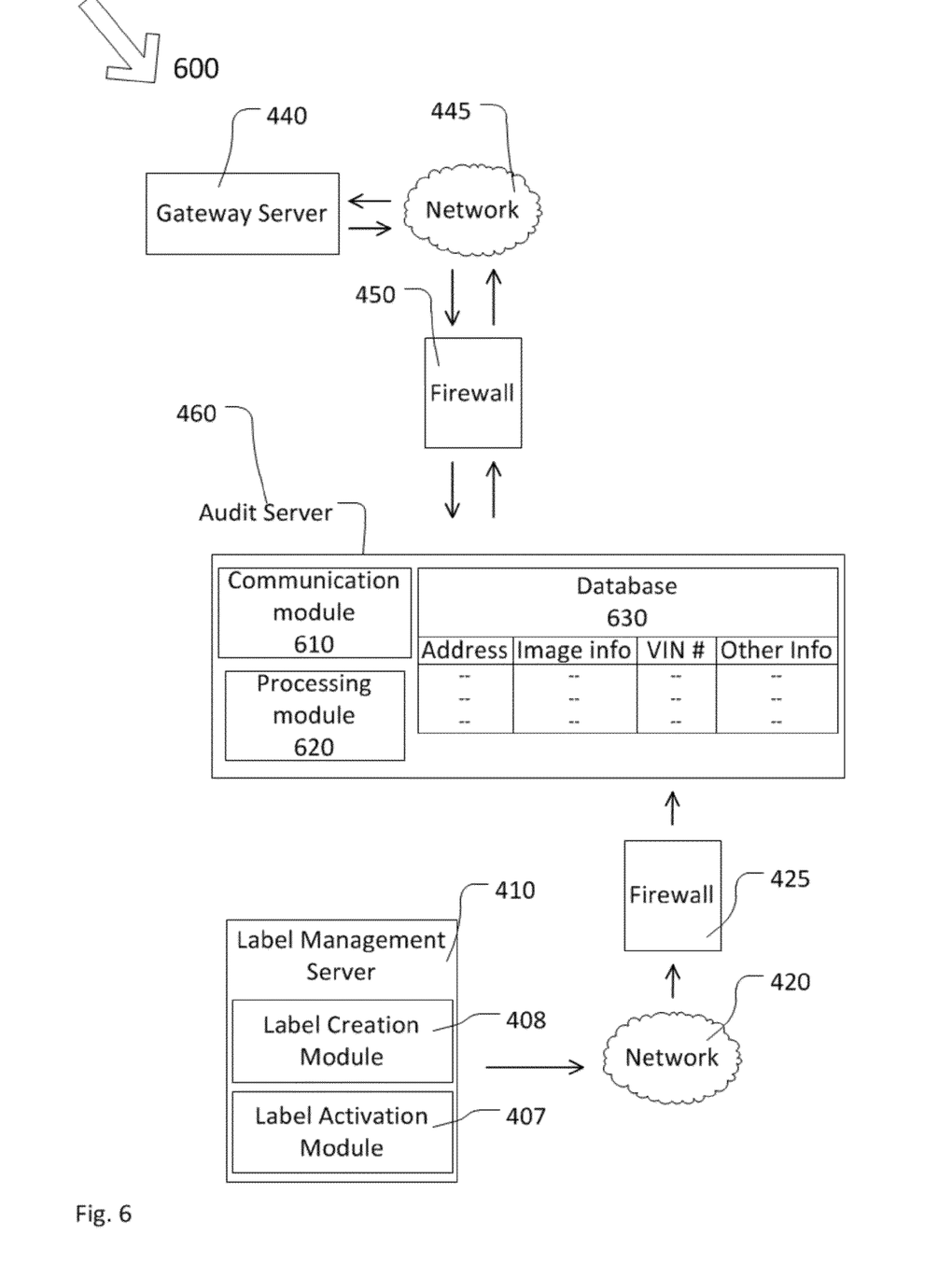
FIG. 6 is a block diagram depicting another part of the system of FIG. 4.

As best shown in the block diagram 600 of FIG. 6, the audit server 460 includes hardware and software programmed to perform certain functions in response to software instructions contained in a computer readable medium. The audit server 460 includes a communication module 610, a processing module 620, and the aforementioned database 630. The audit server hardware may include communication interfaces, input devices, output devices, and buses to interconnect the components of the audit server, such as processors, microprocessors, RAMs, dynamic storage devices, ROMs, and other storage devices.

The communication module 610 sends and receives information to/from the gateway server 440. The received information from the gateway server 440 may contain an address location in the database 630, the audit pattern image information associated with that address location and the asset identification number such as the VIN. The processing module 620 processes instructions related to the operation of the audit server 460, and retrieves the stored audit reference image information in the database 630 at the address identified by the captured information from the gateway server 440, and compares the stored audit reference image information in the database 630 with the captured auditing information received from the gateway server 440. If captured auditing information from the gateway server 440 matches all attributes of the stored audit reference image corresponding to the address location, then the processing module 620 sends an output to the ABFS 480 with a message, such as "asset has been found to be in the inventory" or a similar message. If there is no match, then the processing module 620 sends an output to the gateway server 440, such as "unable to confirm the presence of asset in the inventory, request reconfirmation", or a similar message. Audit server 460 also receives data from the LMS 410 through the communication module 610. When the auditing label has been activated by the label activation module 407, the LMS 410 will send all the captured reference audit and identification information to the audit server 460 and the database 630 for storage.

Figure 7:
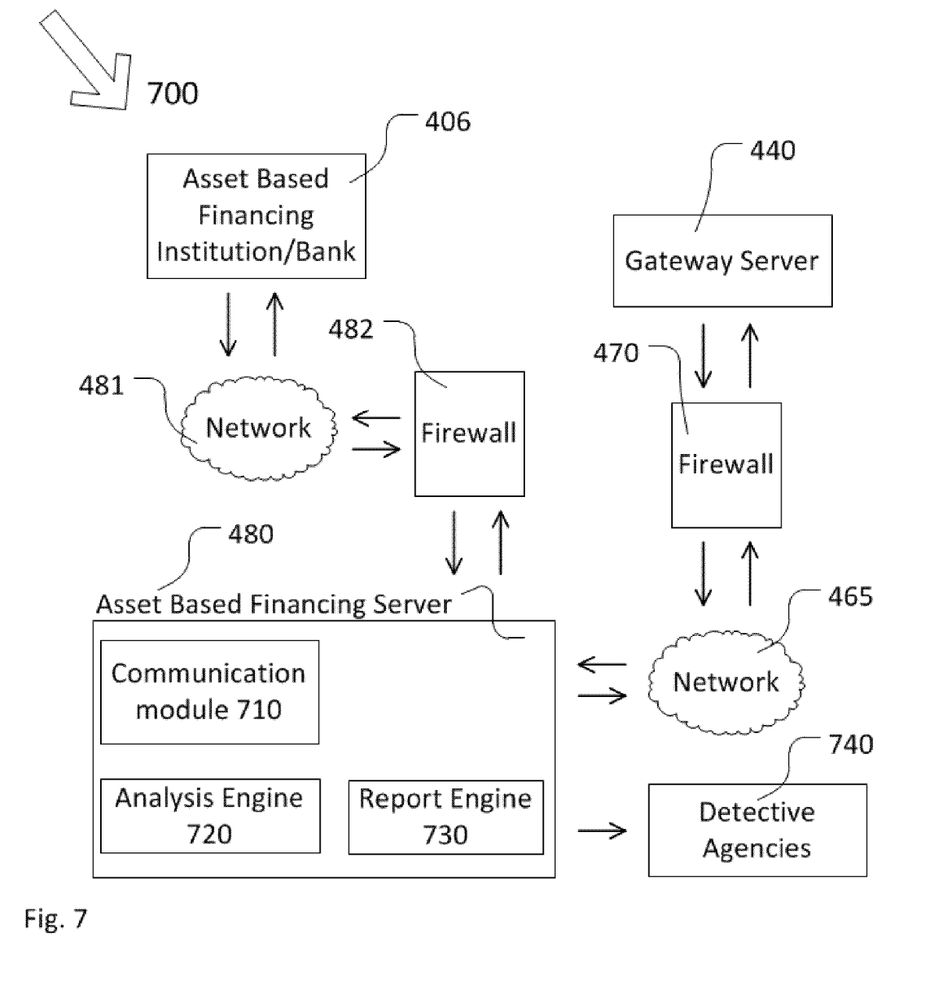
FIG. 7 is a block diagram depicting still another part of the system of FIG. 4.

Reference numeral 700 in FIG. 7 generally identifies a block diagram that depicts key components of the ABFS 480. A communication module 710 sends and receives information to/from the gateway server 440 and also communicates with the lender facility 406. When the lender requests that assets at dealer/retailer site 414 be audited, the communication module 710 requests the gateway server 440 to approach the dealer at site 414 to use the devices 415 to capture and send the captured information. An analysis engine 720 analyzes the captured information of the audited assets to determine which assets were supposed to be in the inventory, and which assets have been confirmed to be present at the inventory location 414. The analysis engine 720 also conducts data mining based on hardware or software logic, and as requested by the lender. A report engine 730 creates inventory reports for the lender in a format specified by the lender based on the analysis by the analysis engine 720 and communicates these reports through the communication module 710 to the lender. Whenever departures from the expected norm are detected, this information is communicated to the lender and also to detective agencies/law enforcement 740 for action. Alternatively, statistical control charts and other analytical instruments can be created for those locations where instances of breaches in the inventory auditing are numerous.

Figure 8:
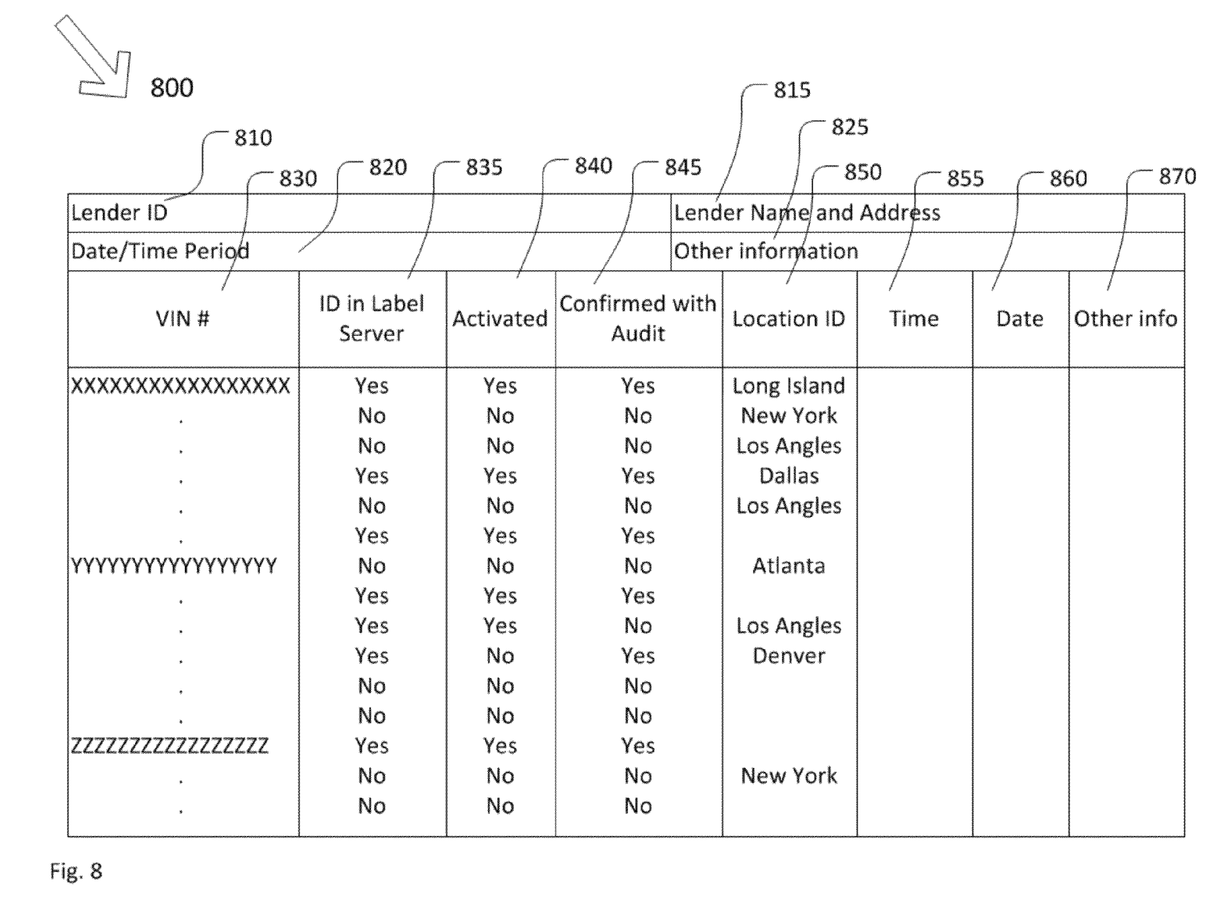
FIG. 8 is an exemplary database structure generated in accordance with this invention.

Reference numeral 800 in FIG. 8 depicts an exemplary report or database structure that contains the inventory information that may be communicated to a lender in accordance with this invention. Thus, the lender ID is included in field 810. The field 815 shows the lender name and the address of the lender location that is tracking the floor-planned assets. Field 820 includes the time period for which the data has been collected for communicating to the lender. Any other information regarding the lender may be included in 825. The field 830 includes the ID of the assets such as the VIN for each car that is being tracked, traced and audited at the location 414. The field 835 shows whether or not the assets were included in the label management server. Field 840 shows whether or not the assets were activated, and field 845 shows whether or not the assets were found to be in the inventory when audited. Field 850 shows the locations for each asset when audited. It may include specific location, address and a city. Field 855 shows the time when tracking and the auditing attempt was made, and field 860 shows the date of the audit attempt. The field 870 may include any other information that a lender may require from the tracking, tracing and audit system to assure inventory integrity. The database structure 800 is only exemplary and is not meant to be all inclusive. The information as compiled in structure 800 is used to produce reports for each lender and detective agencies/law enforcement 740 to know where and when the inventory integrity has been breached.

It will be understood that each of the elements described above, or two or more together, also may find a useful application in other types of constructions differing from the types described above. For example, other audit pattern signatures may also be employed, such as physically unclonable functions (PUF) that exploit the physical properties of disordered structures, i.e., microstructures characterized by an explicitly-introduced randomness or an intrinsic randomness. These signatures use a challenge-response mechanism. When a physical stimulus is applied to the microstructure (called a challenge), the stimulus interacts with the microstructure of the object and provides a response. Since the microstructure depends on the physical factors introduced in manufacturing and is unpredictable, each challenge-response behavior is different and unpredictable, and this property may be used for auditing. These auditing pattern signatures are also within the scope of the present invention.

As another example, the interrogation device need not be an image capture device as described above, but could, in general, be any interrogation device, that reads a unique auditing pattern signature and may be based on optical principles as described above, but could be based on electrical, magnetic, electromagnetic, electro-optic, or magneto-optic principles, etc. Also, visible light need not be used, because ultraviolet and infrared light could also be employed. Characteristics other than reflection, absorption and scattering, such as fluorescence, could also be employed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of remotely auditing inventoried assets, comprising:
configuring auditing information for each asset as a random distribution of non-clonable elements by creating an auditing label for each asset with the non-clonable elements configured as a random distribution of three-dimensional light-modifying elements thereon as the auditing information;
associating the auditing information with each asset by applying the auditing label on each asset;
associating identification information with each asset by creating an identification label for each asset with the identification information thereon, and by applying the identification label on each asset;
capturing the auditing information and the identification information from the auditing label and the identification label associated with each asset with an interrogation device at an inventory location;
identifying each asset from the captured identification information at the inventory location;
determining from the captured auditing information whether each identified asset is present or absent at the inventory location by verifying that the light-modifying elements on the auditing label are indeed three-dimensional; and
sending to auditor inventory information about the assets based on the captured auditing information and the captured identification information.

2. The method of claim 1, wherein the capturing is performed by imaging the auditing information to generate an auditing image pattern; and wherein the determining is performed by comparing the auditing image pattern with a reference auditing signature, and by indicating that the asset is present when the auditing image pattern matches the reference auditing signature.

3. The method of claim 1, and applying the auditing label on the asset at a position away from the identification label.

4. The method of claim 1, and superimposing the auditing label on the identification label on the asset.

5. The method of claim 3, wherein the capturing is performed by also capturing the position of the auditing label relative to the identification label, and wherein the determining is performed by determining the captured position of the auditing label.

6. The method of claim 1, wherein the associating and the capturing of the identification information and the auditing information are performed at the inventory location by a party under the direction of a lender, and wherein the sending is performed in response to a request from the lender.

7. The method of claim 1, and activating the auditing label after capturing the auditing information and the identification information at the inventory location, and subsequently storing the captured auditing information and the identification information in a database.

8. A system for remotely auditing inventoried assets, comprising:
a label manufacturing facility creating an auditing label applied to each asset with auditing information configured as a random distribution of three-dimensional, non-clonable, light-modifying elements thereon, and creating an identification label applied to each asset and bearing identification information;
an interrogation device capturing the auditing information, as well as the identification information, from the auditing label and the identification label associated with each asset at an inventory location;
a server identifying each asset from the captured identification information at the inventory location, and determining from the captured auditing information whether each identified asset is present or absent at the inventory location by verifying that the light-modifying elements on the auditing label are indeed three-dimensional; and
a report engine sending to auditor inventory information about the assets based on the captured auditing information determined by the server and the captured identification information identified by the server.

9. The system of claim 8, wherein the interrogation device is images the auditing information to generate an auditing image pattern; and wherein the server is compares the auditing image pattern with a reference auditing signature, and indicates that the asset is present when the auditing image pattern matches the reference auditing signature.

10. The system of claim 8, wherein the auditing label created by the label manufacturing facility is applied on the asset at a position away from the identification label that bears the identification information thereon.

11. The system of claim 8, wherein the auditing label created by the label manufacturing facility is superimposed on the identification label that bears the identification information thereon.

12. The system of claim 10, wherein the interrogation device captures the position of the auditing label relative to the identification label, and wherein the server is operative determines the captured position of the auditing label.

13. The system of claim 8, wherein
the interrogation device is operated at the inventory location by a party under the direction of a lender, and wherein the report engine is operated in response to a request from the lender.

14. The system of claim 8, and a label activating module activating the auditing label after the interrogation device has captured the auditing information and the identification information at the inventory location, and after the server has confirmed that the light-modifying elements on the auditing label are indeed three-dimensional.

* * * * *